(12) United States Patent
Weineck

(10) Patent No.: US 7,184,863 B2
(45) Date of Patent: Feb. 27, 2007

(54) MONITORING AND CONTROL SYSTEM FOR MANNED VEHICLES

(75) Inventor: Johannes Wolfgang Weineck, Heidelberg (DE)

(73) Assignee: Johannes Wolfgang Weineck and Bernard Klein, Heiligkreuzsteinach (DE)

(*) Notice: Subject to any disclaimer, the term of this patent is extended or adjusted under 35 U.S.C. 154(b) by 150 days.

(21) Appl. No.: 10/494,734

(22) PCT Filed: Nov. 6, 2002

(86) PCT No.: PCT/EP02/12394

§ 371 (c)(1),
(2), (4) Date: Oct. 21, 2004

(87) PCT Pub. No.: WO03/039955

PCT Pub. Date: May 15, 2003

(65) Prior Publication Data

US 2005/0065667 A1    Mar. 24, 2005

(30) Foreign Application Priority Data

Nov. 6, 2001 (DE) .................................. 101 54 400

(51) Int. Cl.
*B64D 45/00* (2006.01)
*H04B 7/185* (2006.01)
*G08G 5/00* (2006.01)

(52) U.S. Cl. .............................................. 701/2; 701/11
(58) Field of Classification Search ................. None
See application file for complete search history.

(56) References Cited

U.S. PATENT DOCUMENTS 6,584,383 B2 * 6/2003 Pippenger ...................... 701/3

(Continued)

FOREIGN PATENT DOCUMENTS

DE    199 60 394    5/2001

(Continued)

OTHER PUBLICATIONS

International Search Report completed Feb. 5, 2003 for PCT/EP 02/12394 filed Nov. 6, 2002, 2 pages.

Primary Examiner—Michael J. Zanelli
(74) Attorney, Agent, or Firm—BainwoodHuang

(57) ABSTRACT

A monitoring and control system for manned vehicles is being proposed, wherein an automatic early-on recognition of emergencies and an automatic specification of measures to be taken in accordance with a separate escalation assessment concerning the development of the emergency in question are made possible, in that data packets comprising a vehicle identification field, a time indicator field, a continuously updated position field, a continuously updated vehicle-status field and a pilot-confirmation field are either transmitted from the vehicle to a ground station and evaluated there or is transmitted to the ground station already having been evaluated, wherein continuous storing of the data packets is carried out over a limited period of time in the ground station when a first evaluation result is present; in the event of the occurrence of a second particular evaluation result storing is carried out over a longer period of time and at the same time a switchover signal is transmitted to the vehicle, which switchover signal switches over the control from being linked with the cockpit to being linked with the autopilot control station control without being subject to influence by the cockpit, and wherein switching back to the control means being linked with the cockpit is only effected by a reset signal which again is not subject to influence by the cockpit, which reset signal is generated by the ground station, depending on a third particular evaluation result concerning the pilot-confirmation field, and transmitted to the vehicle.

11 Claims, 4 Drawing Sheets

U.S. PATENT DOCUMENTS

| | | | |
|---|---|---|---|
| 6,658,572 B1* | 12/2003 | Craig | 726/16 |
| 6,681,158 B2* | 1/2004 | Griffith et al. | 701/3 |
| 6,810,310 B1* | 10/2004 | McBain | 701/3 |
| 6,897,790 B2* | 5/2005 | Orton | 340/945 |
| 6,995,688 B2* | 2/2006 | Reynolds | 340/945 |
| 2002/0107694 A1* | 8/2002 | Lerg | 704/273 |
| 2003/0052798 A1* | 3/2003 | Hanson | 340/945 |
| 2003/0130770 A1* | 7/2003 | Matos | 701/3 |
| 2004/0056770 A1* | 3/2004 | Metcalf | 340/574 |
| 2006/0032987 A1* | 2/2006 | Akers et al. | 244/175 |

FOREIGN PATENT DOCUMENTS

| | | |
|---|---|---|
| FR | 2 584 842 | 1/1987 |
| WO | WO 00/44580 | 8/2000 |

\* cited by examiner

MONITORING AND CONTROL SYSTEM FOR MANNED VEHICLES

FIELD OF EMBODIMENTS OF THE INVENTION

The invention concerns a monitoring and control system for manned vehicles, in particular for vehicles that are not confined to rails and are, in normal operation, conducted from a cockpit or from an autopilot control station, on a largely arbitrarily modifiable course between a point of departure and a destination.

BACKGROUND

It is generally known that unforeseen incidents during preparation of the departure, during travel between point of departure and destination, and also at the destination, may cause a great hazard to the crew, to vehicle passengers, to the cargo, and also to uninvolved third persons on the vehicle's way between point of departure and destination.

Examples for such unforeseen incidents are damages to the vehicle owing to collisions, shifting of the cargo, weather influences and the like, in such an extent that the vehicle can not be manoeuvred any more through steering by the pilot. Further examples for unforeseen incidents are intervention by unrecognizedly criminal members of the crew, unrecognizedly criminal passengers, or an intervention from outside via remote-action channels in turn through criminal circles. Here one may also consider acute emergencies through health disorders, poisoning, pressure loss, and the like.

What has been known for a long time are monitoring and control systems for rail-bound vehicles containing a so-called dead-man's button that has to be actuated by the engineer at particular time intervals to thereby verify the engineer's attentiveness and unimpaired health. If this actuation does not take place, emergency braking of the train in question is triggered.

Moreover generally known are autopilot systems for airborne vehicles that are controlled automatically through considerable durations of time or stretches of way in accordance with a predetermined course at a predetermined height as soon as the pilot switches over from manual operation to autopilot operation. Such autopilot systems have proven their usefulness in many emergency situations, however are not outside the reach of airplane hijackers, takers of hostages and the like criminals. Quite similar restrictions apply to autopilots of watercraft.

From DE 19960394 A1 a monitoring and control system for airplanes is known, wherein airplane-status current data are transmitted via a satellite transmission path to a ground station and are stored there for a particular period of time, such as, e.g., for the period of time of the entire flight or for a limited period of time under constant rewriting of earlier data. Depending on a particular result of the evaluation of the airplane-status current data, e.g., when malfunctions occur in the airplane, the airplane can be remote-controlled from the ground station.

In the known systems it is a drawback that in many cases the history of an unfolding emergency situation like, for instance, absence of regular vehicle steering from the cockpit, is not taken into consideration, and thus emergency measures are generally initiated at such a late point of time that serious damages can not be avoided any more.

SUMMARY

The purpose of the invention is to attain the objective of designing a monitoring and control system for manned vehicles having various features, such that an automatic early-on recognition of emergencies and automatic specification of measures to be taken in accordance with a separate escalation assessment concerning the development of the emergency in question are possible.

This objective is attained in accordance with the invention through the varies features.

Advantageous embodiments and developments are subject matters of various claims, the contents of which shall presently expressly form part of the description without their language being repeated here.

Before entering into a detailed description of embodiments it is in this place noted in general that the proposed monitoring and control system does not relate to the association of a single vehicle to a single ground station and to a single set of satellites, but that a network of ground stations, a multiplicity of participating communications transmission satellites, and a network of evaluation stations may be provided which are associated with an extraordinarily large number of monitored and emergency-controlled vehicles and operate for this purpose in multiplexing or multi-channel operation, with the measures and means necessary to this end being known per se to the person having skill in the art.

BRIEF DESCRIPTION OF THE DRAWINGS

In the enclosed drawings for the explanation of practical examples.

DESCRIPTION

Figure 1:
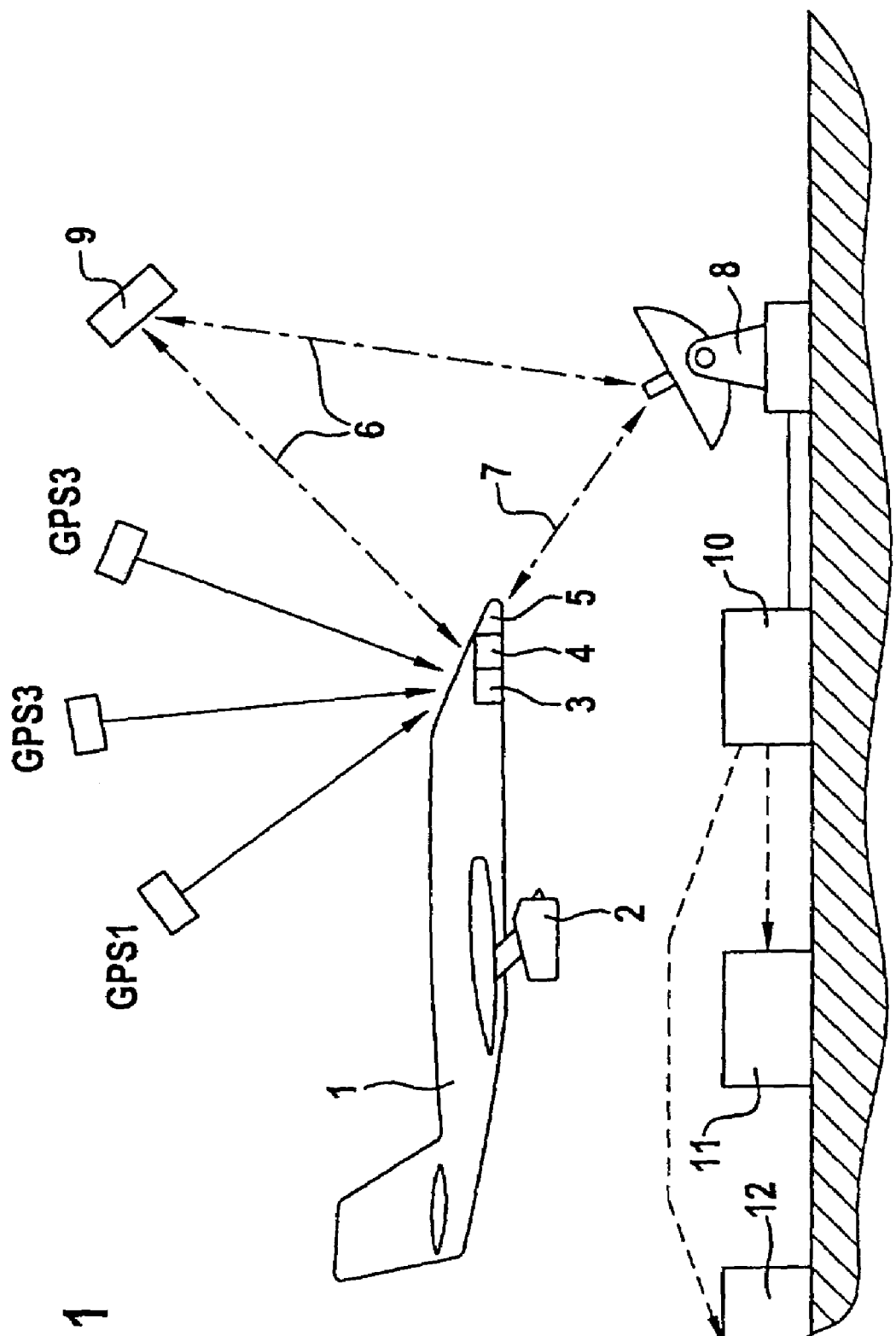
FIG. 1: shows a schematic situation drawing with an airplane in flight inside the range of a GPS system, a data transmission satellite, and a ground station.

The airplane 1 shown in FIG. 1 contains as a drive means jet engines 2 as well as a control means 3 influencing these and control surfaces of the wings and of the tail group, as well as navigation means 4 which collect information data for determining position and status of the vehicle, such that the pilot may operate the control means for steering a particular course towards a point of destination from the cockpit. In the airplane 1 an autopilot control station is moreover installed which takes over operation of the control means following a switchover command by the pilot.

The navigation means 4 contain an inertial platform or a gyro compass for providing reference quantities for attitude determination. Moreover the navigation means 4 are connected with an antenna array 5 which may contain antennas located, e.g., in the nose or antennas accommodated in spaces at the cabin ceiling. Via the antennas of the antenna array 5 the airplane 1 receives direction signals for continuous location determination from satellites GPS 1, GPS 2, GPS 3. Furthermore the airplane 1 is, via bidirectional data transmission channels 6 and 7, connected to a ground station 8 forming part of a network, in particular a global network, of ground stations. The bidirectional data transmission channel 7 extends directly between airplane 1 and ground station 8, while the bidirectional data transmission channel 6 is routed in the represented manner via a communication satellite 9. The communication satellite 9 may also belong to the system comprised of the satellites GPS 1 to GPS 3.

Ground station 8 may be connected via cable or radio connections with evaluation means 10, 11, 12 etc., with these evaluation means evaluating information data collected by the navigation means of airplane 1 or, on the other hand, performing an additional evaluation in case the information means already contain on-board evaluation means, so that data packets with information data at least in part already evaluated are transmitted from the airplane to ground station 8.

Figure 2:
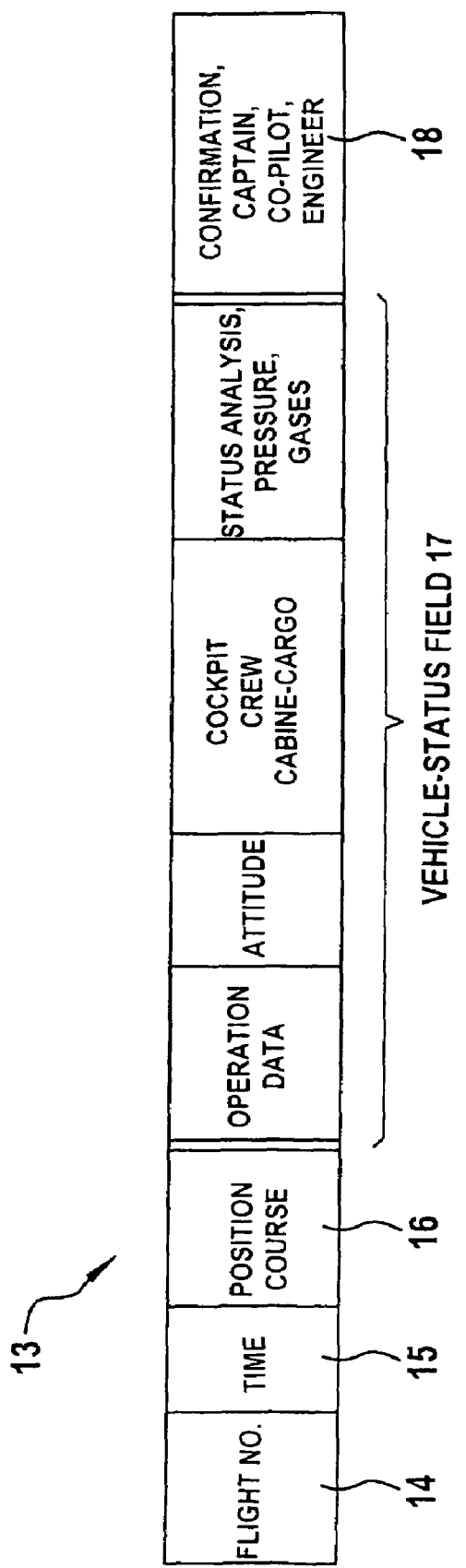
FIG. 2: is a schematic representation of a data packet for constantly recurring transmission from a vehicle to a ground station.

Data packets of the kind presently considered are schematically represented in FIG. 2 and shown designated by 13. With the aid of transmitter and/or receiver means of airplane 1, not shown in FIG. 1, data packets 13 are transmitted via communication satellite 9 on data transmission path 6 to ground station 8. The data packets contain a vehicle identification field or flight number field 14, a time indicator field 15 characterizing the transmission time, a continuously updated position field 16 indicating the momentary position and the momentary course, and finally a continuously updated vehicle-status field 17.

The vehicle-status field 17 contains information data concerning the operating condition of the engines, the actual position, the control surfaces of tail group and wings, and the like. Moreover the vehicle-status field 17 also contains data characterizing the respective attitude derived from the inertial platform or from the gyro of the airplane. In addition, field 17 contains data corresponding to optical and acoustic information for a description of the condition inside the cockpit, the condition of the crew, the condition of passengers in the cabin, and the condition of the cargo. The information data may moreover also contain status analysis results, gas analysis results, measured pressure values, and the like.

The vehicle-status field 17 of data packet 13 is moreover followed by a pilot-confirmation field containing data created by a particular input through the pilot at an input terminal, which is then added to vehicle-status field 17. This input may be completed by additional confirmation input by the co-pilot or engineer. The pilot-confirmation field shown under 18 in FIG. 2 may in accordance with a development be a digital signature attached by the flight captain to the digital data of fields 14 to 17.

If it turns out upon evaluation of data packet 13 in ground station 8 that pilot-confirmation field 18 was not correctly attached by the pilot or not attached at all by the pilot or, in turn, not attached by pilot, co-pilot and technical officer in regular conformity, then the presence of an emergency is indicated upon evaluation of data packet 13, irrespective of the data contents of fields 14 to 17.

If, however, pilot-confirmation field 18 has an expected regular configuration in each data packet transmission to the ground station, e.g. at time intervals of 10 minutes, and expected regular contents, then this is to be referred to as a first evaluation result, which has the effect that the data packets are stored in the ground station over a predetermined, limited period of time, and storing is updated at the timing of transmission of the data packets, with the possibility of selected data being in addition continuously stored over a longer period of time.

If, however, an irregularity in terms of form or contents takes place during the evaluation of pilot-confirmation field 18, this is to be referred to as a second evaluation result now causing continuous storing of the data packets in the ground station, without older data packets being replaced with more recent data packets. Storing is carried out continuously over a longer period of time so as to provide the option of monitoring the history of an emergency situation in ground station 8.

Simultaneously with determination of an irregularity in the pilot-confirmation field 18 by the evaluation means of the ground station, a switchover signal is formed there and transmitted to the vehicle via data transmission path 6 and via satellite 9, or also via direct data transmission channel 7. This switchover signal has the effect that the control means of the airplane 1 are switched over from being linked with the cockpit to being linked with the autopilot control station that is not subject to influence from the cockpit. Switching the control means back to being linked with the cockpit can no more be effected from the control station and may only be performed through a reset signal that is generated by the ground station when an examination of pilot-confirmation field 18 of the data packet transmitted next shows an evaluation result justifying such switching back, which is to be referred to as a third evaluation result. This third evaluation does, of course, not have to conform with the first evaluation result. It may rather in addition have to satisfy more severe evaluation criteria, such as of the kind that the result of a voice analysis and/or speech recognition analysis or the like need to be positive in the pilot-confirmation field, in addition to confirmation of the regular condition of the vehicle by the flight captain.

Where it is to be feared that the information transmission on data transmission paths 6 and 7 is being monitored, jammed, or falsified, data transmission may take place on these paths while coded or encrypted. A data compression furthermore allows an accelerated timing of the data packet transmission.

When the second evaluation result—and thus a deviation of the contents of pilot-confirmation field 18 from regular form or regular contents—occurs, the timing frequency of the data packet transmission is suitably increased so as to avoid information gaps in the examination or analysis of the history of an emergency.

To be sure, not only an evaluation with regard to the pilot-confirmation field and the information data contained therein, but also a continuous evaluation of the information data of the vehicle-status field of the transmitted data packets 13 is carried out. In a case of a significant deviation of particular data of vehicle-status field 17, a warning evaluation result switching signal is obtained which is formed in the airplane in case a preliminary evaluation already takes place in the airplane 1, or which is formed in ground station 8 and transmitted to airplane 1 via one of data transmission path 6 or 7 or redundantly via both paths in case the entire evaluation takes place in ground station 8. This switching signal, corresponding to a warning evaluation result with regard to vehicle-status field 17, has the effect that the vehicle-status data is continuously transmitted via data transmission path 6 and satellite 9 or immediately via data transmission path 7 to the ground station and/or additional ground stations, to be evaluated and also continuously stored there over a prolonged period of time. This means that instead of the "black box" in the airplane known per se, or in addition thereto, a black-box recording in association with a particular one of the monitored airplanes is created in ground station 8.

Figure 3:
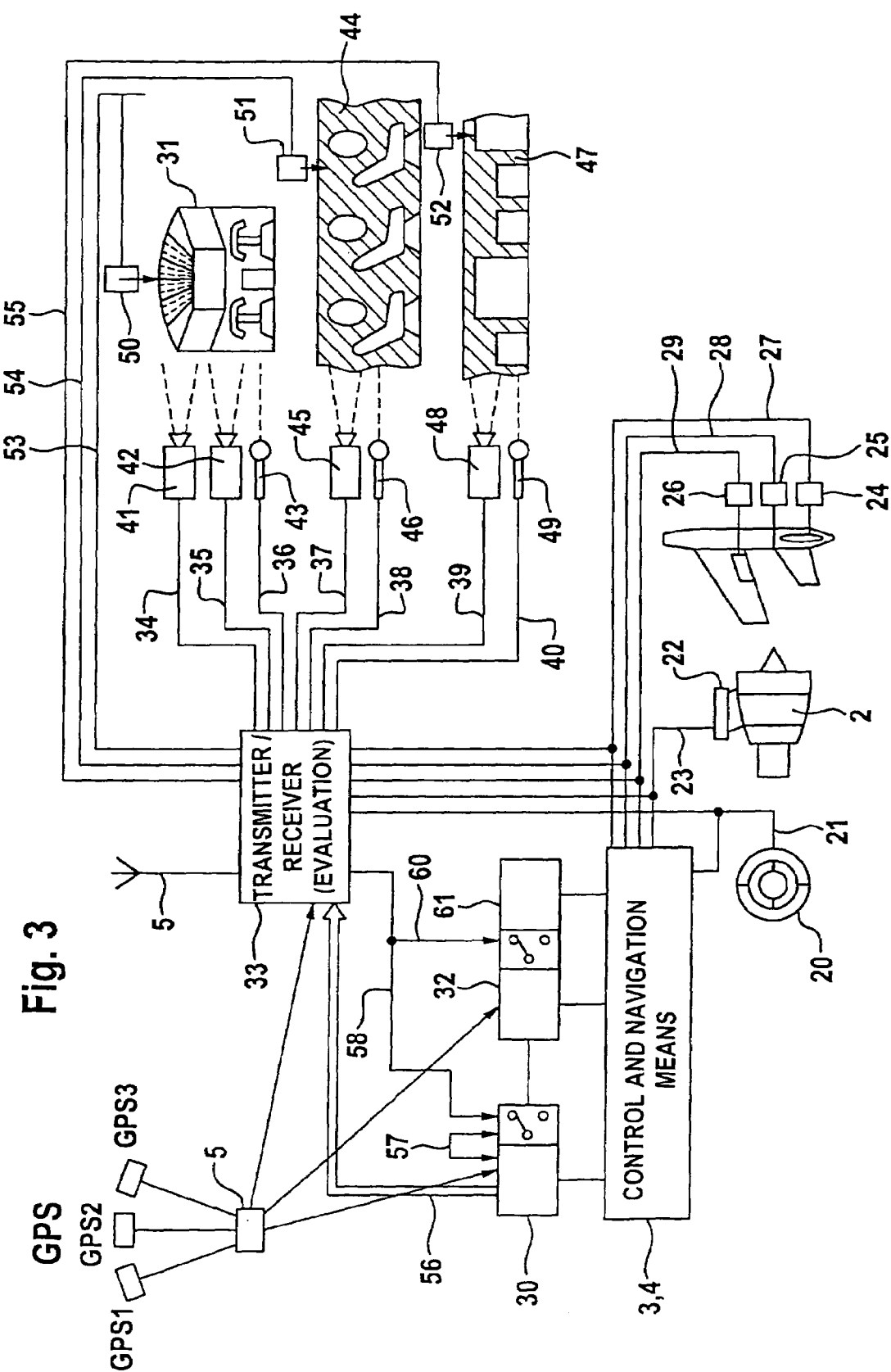
FIG. 3: is a schematic, more detailed drawing of the on-board components of the monitoring and control system of the kind presently proposed.

FIG. 3 indicates in what manner the information data to be written into the single field sections of vehicle-status field 17 of data packet 13 is obtained in airplane 1.

The airplane 1 contains in a generally known manner an inertial platform or a gyro compass 20 from which data concerning course and attitude is derived and presented via a line 21. In addition, engine sensors 22 are associated to the engines 2 that emit on a line 23 operation data signaling the respective momentary operating condition of the engines. Furthermore respective rudder sensors 24, trim angle sensors 25 and elevator sensors 26 are associated to corresponding control surfaces of the airplane and generate corresponding actual-position signals on signal lines 27 or 28 or 29. The control and navigation means 3, 4 thus receive via signal lines 21, 22 and 27 to 29 and via additional signal lines, that are connected with sensors essential for in-flight operation, the operation-actual data and attitude data that is required at the control station 30 in the cockpit 31 of the airplane 1 by the pilot for regular controlling and steering of the airplane 1. This is the same operation-actual data and attitude data that is also required by the autopilot control station 32, in connection with an autopilot program, for carrying out regular automatic control and steering of the airplane.

Any operation-actual data and attitude data occurring on signal lines 21, 23, 27 to 29 and additional signal lines are digitized, inserted into data packet 13, and supplied to transmitter/receiver means 33 of the airplane to then, optionally following preliminary evaluation, be made available for emission to ground station 8 via antenna array 5.

Apart from the data containing the information about the operation-actual status of the airplane and about the attitude, there also arrives at transmitter/receiver means 33 optical and acoustic information having the form of digitized electrical signals via signal lines 34 to 40 drawn in FIG. 3 by way of example. These signal lines conduct signals in accordance with information within vehicle-status field 17 of data packet 13 concerning the cockpit, the crew, the cabin or the passengers in the cabin, the cargo, and the analysis results of gas analysis apparatus and pressure sensors.

In detail, e.g., two video cameras 41 and 42 are trained at the control centers of the cockpit, and a microphone 43 is installed in the cockpit 31, wherein it is also possible that microphone 43 is replaced by a plurality of directional microphone directed at particular areas of cockpit 31.

The recording range of a video camera 45 and of a microphone 46 is directed at the passenger cabin 44. In a corresponding manner, the respective recording ranges of a video camera 48 and of a microphone 49 are directed at the cargo bay 47.

Pressure sensors and gas analysis apparatus 50, 51 and 52 are associated to the cockpit 31 or cabin space 44 and to the cargo bay 47, respectively, and provide corresponding status reporting signals via signal lines 53 or 54 and 55, respectively, to the transmitter/receiver means 33.

Finally the transmitter/receiver means 33 moreover receive from control station 30 that data which, optionally in combination with a digital signature, fill the pilot-confirmation field 18 of data packet 13, with this data being supplied via a transmission channel or a line connection 56 from control station 30 to transmitter/receiver means 33.

Switching over from operation controlled by the flight captain to autopilot operation may under regular conditions be performed from the control station 30 by means of a switchover signal on line 57, with this switching over being capable of being carried out and again invalidated by the flight captain or by an authorized crew member.

If, however, ground station 8 states during the evaluation of pilot-confirmation field 18 of the data packet 13 transmitted to it that this pilot-confirmation field was not filled in regularly, then a switchover signal is transmitted from the ground station, either via data transmission path 6 or via data transmission path 7 or via both data transmission paths to transmitter/receiver means 33 of the respective airplane, which switchover signal switches the control and navigation means over from connection with the control station 30 to a connection with autopilot control station 32 that is not subject to influence from the cockpit any more, with this switchover signal being routed via a signal line 58 that is not accessible from the cockpit, or via an encryption data transmission channel from transmitter/receiver means 33 to switchover means.

Such switching over may only be invalidated by a reset signal which is in turn transmitted from ground station 8 to airplane 1, and which is generated and emitted in ground station 8 when the evaluation of pilot-confirmation field 18 in the ground station has shown evidence for a return to a regular pilot confirmation in one of the subsequently transmitted data packets. This evaluation, which then triggers the reset signal, may in accordance with what was said above be carried out subject to more severe criteria.

If no reset signal was generated upon the further evaluation of data packets 13 transmitted to ground station 8 after an occurrence of the switchover signal, resulting in a switchover to autopilot operation, and if an alarm evaluation result with regard to vehicle-status field 17 results upon evaluation of these further data packets 13, then a special switchover signal generated in ground station 8 and transmitted via a signal line 60 to transmitter/receiver means 33 of airplane 1 is routed to a change-over switch of autopilot 32; the latter then switches over—not subject to influence by control station 30 of the airplane—to a special autopilot program that is symbolically indicated under 61 in FIG. 3 and controls a travel situation correction and/or a course correction.

Figure 4:
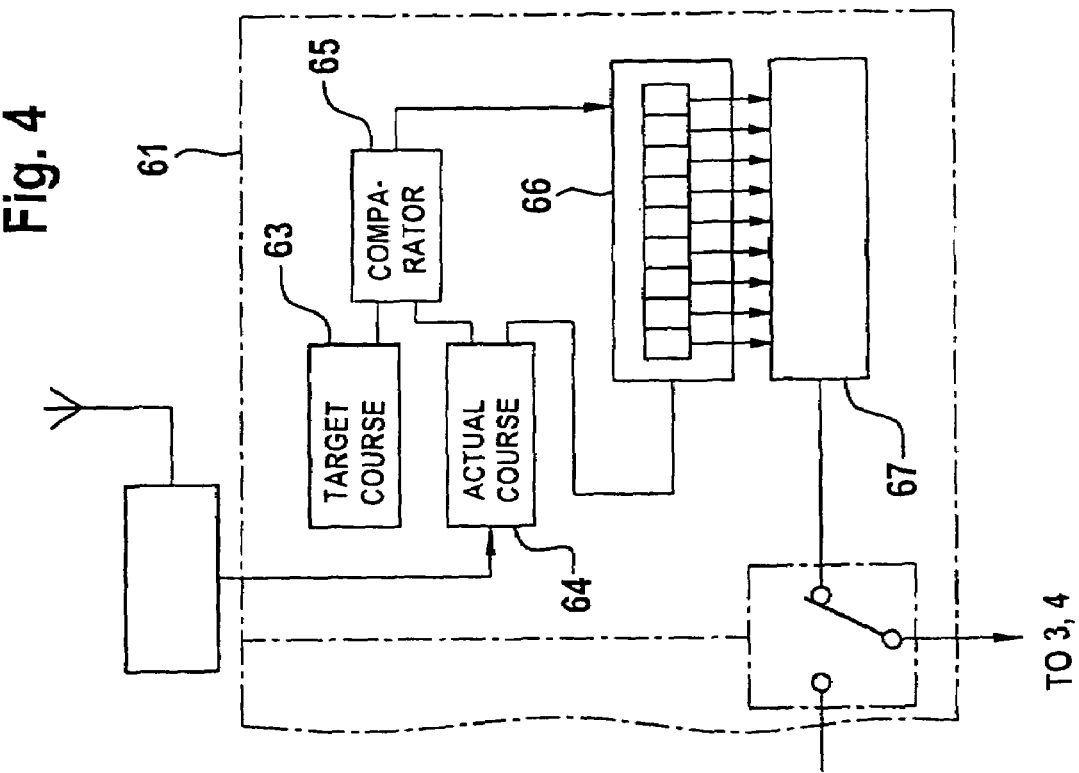
FIG. 4: is a strongly simplified block diagram of an autopilot control station with selectable special autopilot programs.

The function and importance of this particularly suitable development of the presently specified monitoring and control system shall be explained in more detail by referring to FIG. 4.

One example for an acute emergency situation that results in an alarm evaluation result concerning vehicle-status field 17 and/or position field 16 with regard to the evaluation of data packets 13 in ground station 8, is a substantial deviation of the airplane's course from a target course, where it is to be feared that terrorists have within seconds taken over the cockpit, incapacitated the crew, and are steering towards a new target in order to cause the airplane in question to crash there.

If a substantial deviation of course takes place, then the comparison of the outputs of a target course indicator 63 and an actual-course indicator 64 in a comparator 65 results in a comparison signal having a significant absolute value, whereby the output of an emergency control program from an emergency program memory 66 is triggered. Which one of the various emergency programs then reaches the control and navigation means 3, 4 via a buffer 67 is determined depending on the actual course, for which purpose an output of the actual course indicator 64 is supplied to a program selection input of the emergency program memory 66.

The single emergency programs are subject to determination with regard to the flight height to be steered by the autopilot and the direction in accordance with the momentary actual position of the airplane immediately preceding takeover by the autopilot, so that the airplane may be steered away in height and direction from possible targets of a terrorist or criminal person or group of person, wherein the selection of velocity and height moreover ensures health and life of the passengers for the case of a pressure leak in the hull of the plane, avoids a crash or collision upon crossing mountain ranges, and ensures the plane to remain accessible for being entered from outside where possible.

In order to obtain meaningful evaluation results from biometric imaging processes, such as for generating the data in the pilot-confirmation field 18 or also for generating the information concerning crew and passengers in vehicle-status field 17, it may be expedient to combine biometric data of a plurality of persons. One example for this is given in FIG. 5 concerning the output signals of a microphone, e.g. of the microphone 43 in the cockpit 31, or of a group of microphones. The microphone output signals may be subjected to a voice sound analysis with spectral filters 70, 71 and 72 and subsequent evaluation means 73. Moreover the microphone output signals may be supplied to speech recognition units 74, 75 and 76 and subsequent evaluation means 77. The outputs of evaluation means 73 and 77, which carry an output signal in the event of a positive evaluation result, are supplied to an AND gate 78 which provides a positive contribution to the pilot confirmation signal to be taken into consideration in the pilot-confirmation field 18. The spectral analyzers 70 to 72 are tuned to the voice sound of pilot or co-pilot and technical engineer, respectively, in particular in accordance with a computer-controlled teaching program, and speech recognition units 74, 75 and 76 are tuned to secret key words allocated to pilot or co-pilot and first officer, respectively, that have to be pronounced by them.

Figure 5:
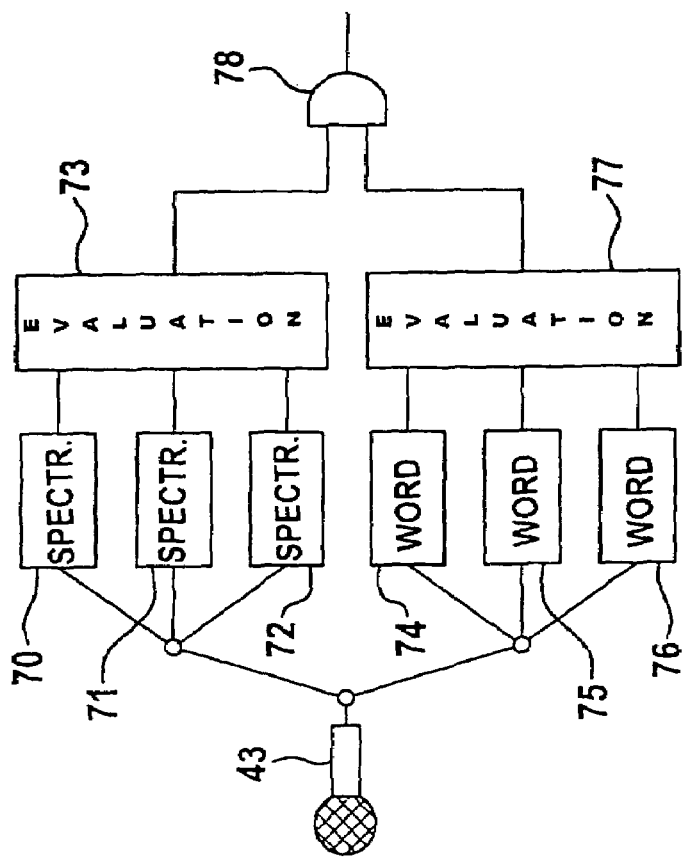
FIG. 5: is a schematic circuit diagram of an acoustic evaluation unit in the system portion of FIG. 3.

In a manner analogous to the circuit of FIG. 5, systems for fingerprint or handprint recognition, iris recognition, etc. may be constructed in respective association to certain crew members.

As was already indicated in the preceding, more severe evaluation criteria by using circuitry like, e.g., in accordance with FIG. 5 may be imposed if—subsequently to ascertaining an irregular pilot confirmation in a data packet 13—switching back from autopilot operation to operation under control by the pilot is then to be triggered again from the ground station.

The invention claimed is:

1. A monitoring and control system for manned vehicles, comprising drive means (2), control means (3) and navigation means (4) for location determination and vehicle-status determination, wherein said control means (3) may be operated depending on information data of said navigation means (4) from a control station (30) or, in a switchable manner, from an autopilot control station (32), and said navigation means are linked with a set of sensors for obtaining actual-vehicle-state data, wherein said actual-vehicle-state data may be transmitted via a satellite transmission path (6) to a ground station (8) and be stored there for a particular period of time, and said vehicle may be remote-controlled from said ground station (8) depending on a particular evaluation result of said actual-vehicle-state data, wherein a data packet (13) containing a vehicle identification field (14), a time indicator field (15), a continuously updated position field (16), a continuously updated vehicle-status field (17) and a pilot-confirmation field (18), is transmitted in a first timing by means of transmitter/receiver means (33) of said vehicle (1) via said satellite transmission path (6) and/or directly (7) to said ground station (8), and said data packet may be evaluated by evaluation means located in said vehicle or in said ground station (8) for the generation of three generation results; such that depending on a first particular evaluation result concerning said pilot-confirmation field (18), continuous storing of said data packets is carried out over a limited period of time in said ground station (8), depending on a second particular evaluation result concerning said pilot-confirmation field (18), continuous storing is carried out over a period of time longer in comparison with said limited period of time in said ground station (8), and at the same time a switchover signal is transmitted from said ground station (8) via said one or via another satellite data transmission path (6) or a direct data transmission channel (7) to said vehicle (1), which switchover signal switches over said control means (3) from being linked with said control station (30) to being linked to said autopilot control station (32) without being subject to influence by the cockpit; and depending on a third particular evaluation result, switching back to said control means (3) being linked with said control station (30) is only effected by a reset signal which again is not subject to influence by the cockpit, which reset signal is generated by said ground station (8), depending on said third particular evaluation result concerning said pilot-confirmation field (18), and transmitted to said vehicle.

2. The system in accordance with claim 1 wherein said data packets (13) and/or said switchover signal and/or said reset signal is/are transmitted between vehicle (1) and ground station (8) in a coded form.

3. The system in accordance with claim 1 wherein said data packets (13) are transmitted from said vehicle (1) to said ground station in a compressed form.

4. The system in accordance with claim 1 wherein the timing frequency of data packet transmission is increased depending on said second evaluation result.

5. The system in accordance with claim 1 wherein depending on a warning evaluation result concerning said vehicle-status field (17), the vehicle-status data is continuously transmitted via at least one satellite data transmission path (6) immediately (7) to at least one ground station (8) for storage and evaluation.

6. The system in accordance with claim 1 wherein depending on an alarm evaluation result concerning said vehicle-status field (17) and/or said position field (16), in the event of a simultaneous occurrence of said second evaluation result concerning said pilot-confirmation field (18), a switchover signal switches over to a special autopilot program of said autopilot (32) that controls a travel situation correction and/or course correction in a manner not subject to being influenced by the control station.

7. The system in accordance with claim 6 wherein said special autopilot program (66) is respectively selected depending on actual data (64) of the vehicle position.

8. The system in accordance with claim 1 wherein said set of sensors contains at least one microphone (43, 46, 49) installed in or on said vehicle (1) and/or at least one image recording camera (41, 42, 45, 48) installed in or on said vehicle and/or at least one pressure sensor installed in or on said vehicle and/or at least one gas analyzer (50, 51, 52) installed in or on said vehicle.

9. The system in accordance with claim 8 wherein said at least one microphone (43, 46, 49) is connected to a sound spectrum evaluation group (70–73) containing voice recognition apparatus (70, 71, 72), the outputs of which are linked such that a positive voice recognition of the pilot and supporting staff associated with the latter results in a release of a pilot confirmation in said pilot-confirmation field (18).

10. The system in accordance with claim 8 wherein said at least one microphone (43, 46, 49) is connected to a word recognition evaluation group (74–77) containing word recognition apparatus (74, 75, 76), the outputs of which are linked such that a positive password recognition of the pilot supporting staff associated with the latter results in a release of a pilot confirmation in said pilot-confirmation field (18).

11. The system in accordance with claim 1 wherein said ground station (8) and/or further ground stations, each of which receive data packets from said transmitter/receiver means (33) of monitored vehicles in evaluation means, contain multiplexers, the timings of which are transmitted synchronously via satellite transmission paths (6) and/or immediately (7) to said vehicles for controlling their transmitter/receiver means (33).

* * * * *